G. T. Savary,
Fly Trap,
No. 44,486.  Patented Sep. 27 1864.

Witnesses:
N. Ames
A. F. Badger

Inventor:
Geo. T. Savary

UNITED STATES PATENT OFFICE.

GEORGE T. SAVARY, OF READING, ASSIGNOR TO BEN. B. SAVARY, OF BOSTON, MASSACHUSETTS.

IMPROVEMENT IN FLY-TRAPS.

Specification forming part of Letters Patent No. 44,486, dated September 22, 1864.

*To all whom it may concern:*

Be it known that I, G. T. SAVARY, of Reading, in the county of Middlesex and State of Massachusetts, have invented a new and useful Improvement in Fly-Traps; and I do hereby declare that the following is a full, clear, and exact description of the construction and operation of the same, reference being had to the accompanying drawings, forming a part of this specification, in which—

Figure 1:
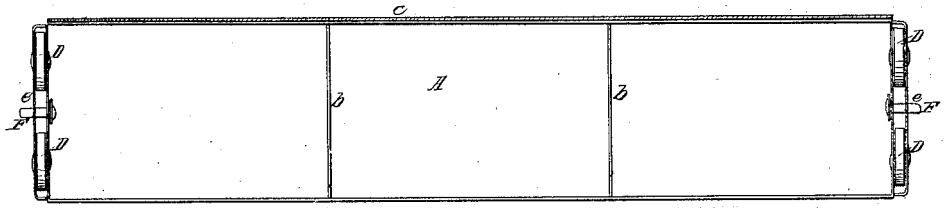
Figure 2:
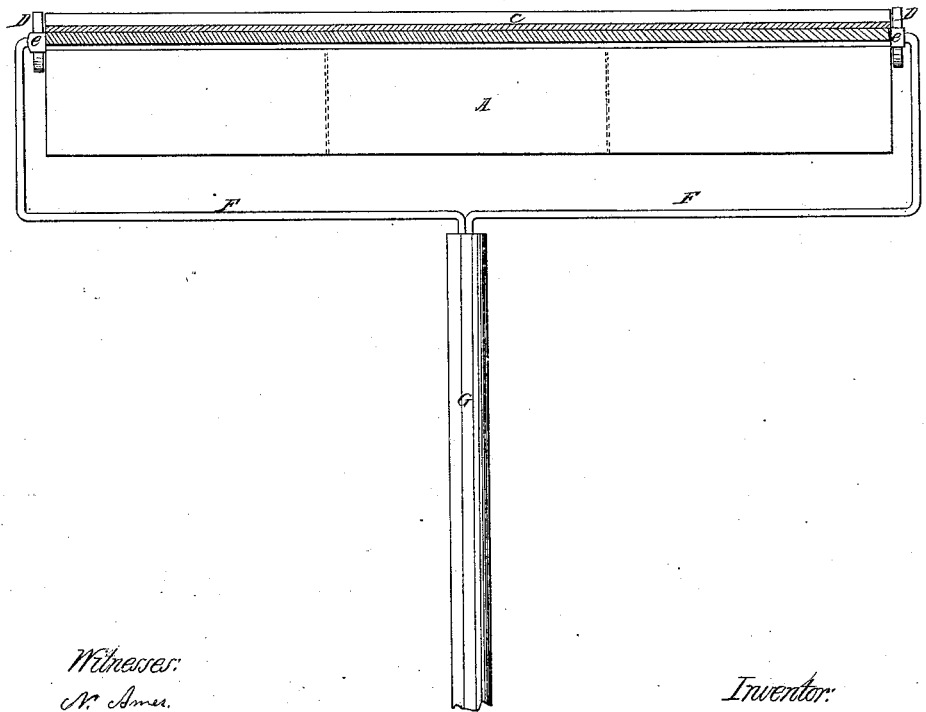

Figure 1 is a top view, and Fig. 2 is a side elevation.

Like parts are indicated by the same letters in both figures.

The design of my invention is to catch flies when they are resting on the ceiling of a room; and its nature consists in furnishing a suitable box or trough, with trundles projecting slightly above the top of the ends, and with a brush or its equivalent attached to the top of the back side of the trough and projecting above the same about as far as the trundles do, said trough being also balanced and supported by a bail or handle and partly filled with soap-suds or other suitable liquid, so that when the trough is trundled on the ceiling of a room its front side will pass under the flies without disturbing them, while the projecting brush upon its back side will sweep them off and cause them to drop into the suds or liquid suspended below them.

To enable others skilled in the art to make and use my invention, I will now proceed to describe its construction and operation.

A is a box or trough of tin or other suitable material about two feet and a half long, four inches wide, and three inches deep. The dimensions of the trough, however, may be varied at pleasure. To prevent the suds or fluid from flowing too freely from one end to the other of the trough when slightly tipped, it is divided into compartments by means of the perforated partitions *b*.

*e e* are cleats attached to the top of the ends of the trough A, as represented in the drawings.

D D D D are trundles of india rubber or other suitable material that will not mar the ceiling by rolling over it. These trundles are placed between the cleats *e e* and the ends of the box and turn on suitable axles fastened therein, as represented in the drawings.

The front side of the box, as shown in Fig. 2, is about three-eighths of an inch lower than the back and ends, so that when trundled on the ceiling it will pass under the flies without touching them.

C is a brush, or its equivalent of cloth, leather, rubber, or other suitably soft and elastic substance, attached to the back side of the box in any convenient manner, and projecting above it as high as the top of the trundles, and so as to just graze the ceiling in passing under it while it sweeps all the flies before it into the fluid in the trough, where they quickly perish.

F is a bail, bent, as shown in Fig. 2, so that its upper ends shall pass through the cleats *e e* and the ends of the trough, whereby the latter is balanced and suspended like a pail, so that the handle can be turned to any required angle without tipping the trough.

G is a wooden handle, from four to six feet (more or less) long, whereby it is obvious that the trough may be raised to the ceiling of a room, and trundled over it in any direction, by a person standing or walking on the floor.

My machine is very simple, cheap, and effectual in ridding a room of flies.

What I claim as new, and desire to secure by Letters Patent, is—

1. The trough A, provided with the brush C and trundles D, substantially as and for the purpose described.

2. Dividing the trough A into separate compartments by means of the perforated partitions *b*, substantially as and for the purpose described.

GEO. T. SAVARY.

Witnesses:
N. AMES,
A. F. BADGER.